United States Patent [19]

Hancock

[11] 4,251,845
[45] Feb. 17, 1981

[54] ARC SUPPRESSOR CIRCUIT
[75] Inventor: Harold E. Hancock, Cincinnati, Ohio
[73] Assignee: Power Management Corporation, Centerville, Ohio
[21] Appl. No.: 7,947
[22] Filed: Jan. 31, 1979
[51] Int. Cl.³ .............................................. H02H 7/22
[52] U.S. Cl. ......................................... 361/8; 361/13; 307/135
[58] Field of Search .................... 361/8, 3, 13, 5, 6, 361/7, 9; 307/134, 135

[56] References Cited

U.S. PATENT DOCUMENTS

| | | |
|---|---|---|
| 3,260,894 | 7/1966 | Denault . |
| 3,555,353 | 1/1971 | Casson ................................. 361/13 |
| 3,639,808 | 2/1972 | Ritzow ................................. 361/13 |
| 3,982,137 | 9/1976 | Penrod ................................. 361/8 |
| 4,025,820 | 5/1977 | Penrod ................................. 361/8 |
| 4,068,273 | 1/1978 | Metzler ................................. 361/3 |

Primary Examiner—Patrick R. Salce
Attorney, Agent, or Firm—Biebel, French & Nauman

[57] ABSTRACT

An arc suppression device for protecting the load carrying contacts (25) of a power contactor (15) includes semiconductor devices (TR1, SCR1,SCR2) connectable in parallel with such contacts through an isolation relay (37,61). Gating current to the semiconductor device is applied after the isolation relay is energized and prior to, during and after the power contacts either close or open; but gating current is not continued after the power contacts have closed to protect the semiconductor against damage. Current to the semiconductor is applied before current is applied to or removed from the coil or solenoid (20) of the power contactor. In one embodiment, relays (39,41,43) within the arc suppression circuit (30) control the isolation relay (37), gating current to the semiconductor (TR1) and the coil of the power contactor in the proper sequence. In another embodiment, time delay means (C4-C7,R1) associated with the relays (61,63,65,67) control their sequence of operation.

10 Claims, 5 Drawing Figures

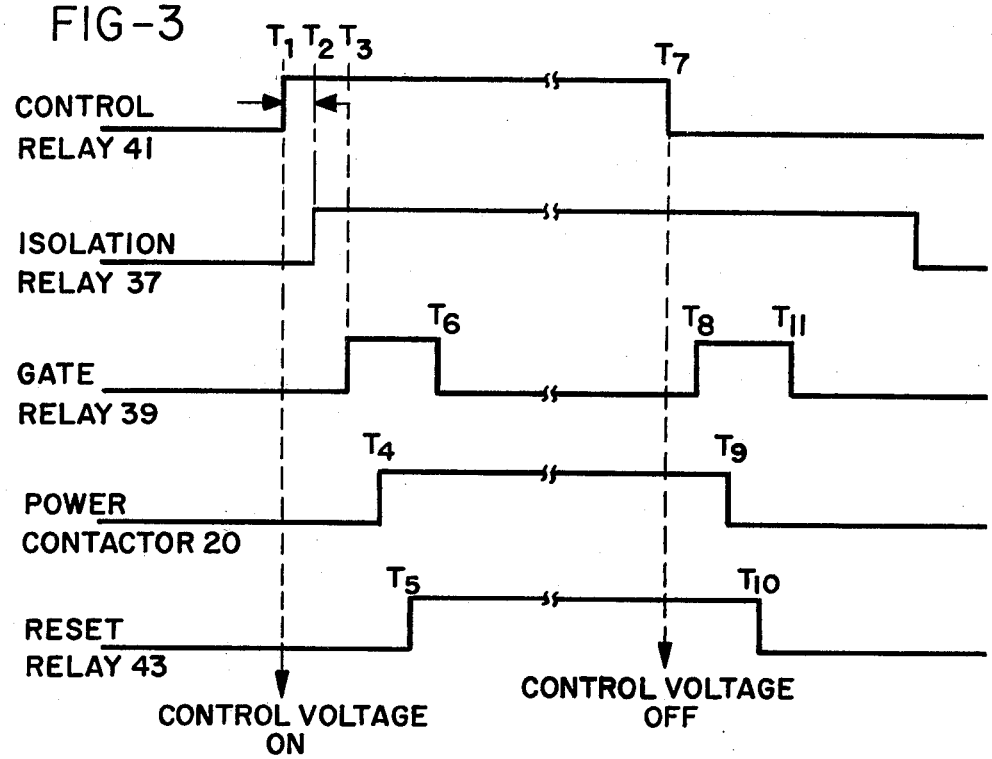
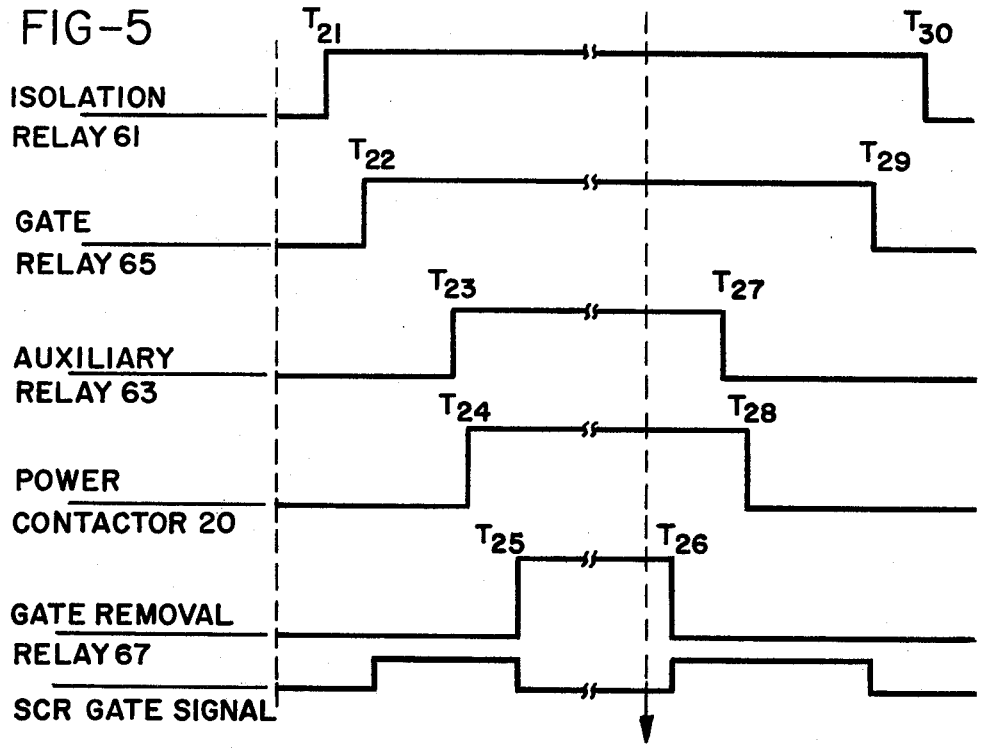

ARC SUPPRESSOR CIRCUIT

BACKGROUND OF THE INVENTION

This invention relates to an arc suppression device which may be connected in parallel with existing power contactors to eliminate substantially arcing across the contacts thereof.

Semiconductor devices have been placed in parallel with the contacts of power contactors to reduce or suppress arcing during contact closure and opening, as shown in U.S. Pat. Nos. 3,260,894; 3,555,353; 3,639,808; 3,982,137 and 4,025,820.

In U.S. Pat. Nos. 3,260,894; 3,892,137 and 4,025,820, gating current to the semiconductor arc suppressing device is provided by an auxiliary contact connected mechanically to the movable contact of a power contactor. This auxiliary contact is designed to close prior to and open following the opening and closing of the power contacts so that the semiconductor device would be provided with gating current during that interval, but not while the main contacts were closed so that the semiconductor device would not be required to carry current continuously should the main contacts fail to close or close with an appreciable resistance therebetween.

In U.S. Pat. Nos. 3,553,353 and 3,639,808, the coil of the power contactor is used to provide gating current to the semiconductor arc suppression means.

In all of the above devices, some modification or redesign of the power contactor or its associated control circuitry is necessary in order to incorporate the arc suppression means.

SUMMARY OF THE INVENTION

In the present invention, an arc suppression circuit is connected to protect the contacts of an existing power contactor.

The present invention employs a plurality of relays which operate sequentially to provide gating current to a semiconductor arc suppression device connectable in parallel with the power contacts. The gating current is applied to the semiconductor device prior to, during and following both the opening and the closing of the power contacts, but gating current is not continued after the power contacts have closed so that the semiconductor devices are protected against damage should the power contacts fail to close completely.

Gating current is supplied to the semiconductor devices before current is applied to or removed from the coil of the power contactor, thus insuring that the semiconductor devices will function properly during those time intervals when arcing is most likely to occur.

Two embodiments of the invention are disclosed. In one embodiment, the relays within the arc suppression circuit are so connected that their sequencing depends on the opening and closing of the contacts of other relays without regard to time delay means. In another embodiment of the invention, time delay means are provided to control the sequencing of the relays.

In both embodiments, an isolation relay is preferably used so that there is no leakage current around the power contacts and through the semiconductor device when the power contacts are open, even though there is no gating current applied thereto.

The semiconductor devices, either unidirectional or bidirectional thyristors, such as silicon controlled rectifiers or triacs, may be provided with gate current from a direct current source to insure that the semiconductor device is properly preconditioned and will begin conducting as soon as the voltage across the thyristor reaches its threshold voltage, thereby reducing substantially the voltage developed between the power contacts, especially during the opening thereof, thus further reducing the tendency for the contacts to arc and be damaged thereby.

Accordingly, it is an object of this invention to provide a device for protecting the contacts of a power contactor having a coil and at least one pair of current carrying or power contacts closable in response to energization of the coil and which includes at least one gate controlled thyristor connectable across the power contacts and means for providing gating current to the thyristor prior to, during and following both the closing and the opening of the contacts. The invention includes gate circuit means for providing gating current to the gate controlled thyristor prior to the coil of the power contactor being energized and prior to the coil of the power contactor being deenergized, means for thereafter energizing or deenergizing the coil of the power contactor, and means for removing gating current to the thyristor after the contacts of the power contactor have either closed or opened. Also, the invention may include isolation means for connecting the thyristor in parallel with the power contacts prior to the closing thereof and disconnecting the thyristor after the power contacts have completely opened and gating current has been removed from the thyristors.

Other objects and advantages of the invention will be apparent from the following description, the accompanying drawings and the appended claims.

BRIEF DESCRIPTION OF THE DRAWINGS

FIG. 3 is a timing diagram illustrating the operation of the embodiment shown in FIG. 2;

FIG. 5 is a timing diagram showing the operation of the embodiment shown in FIG. 4.

DESCRIPTION OF THE PREFERRED EMBODIMENT

Figure 1:
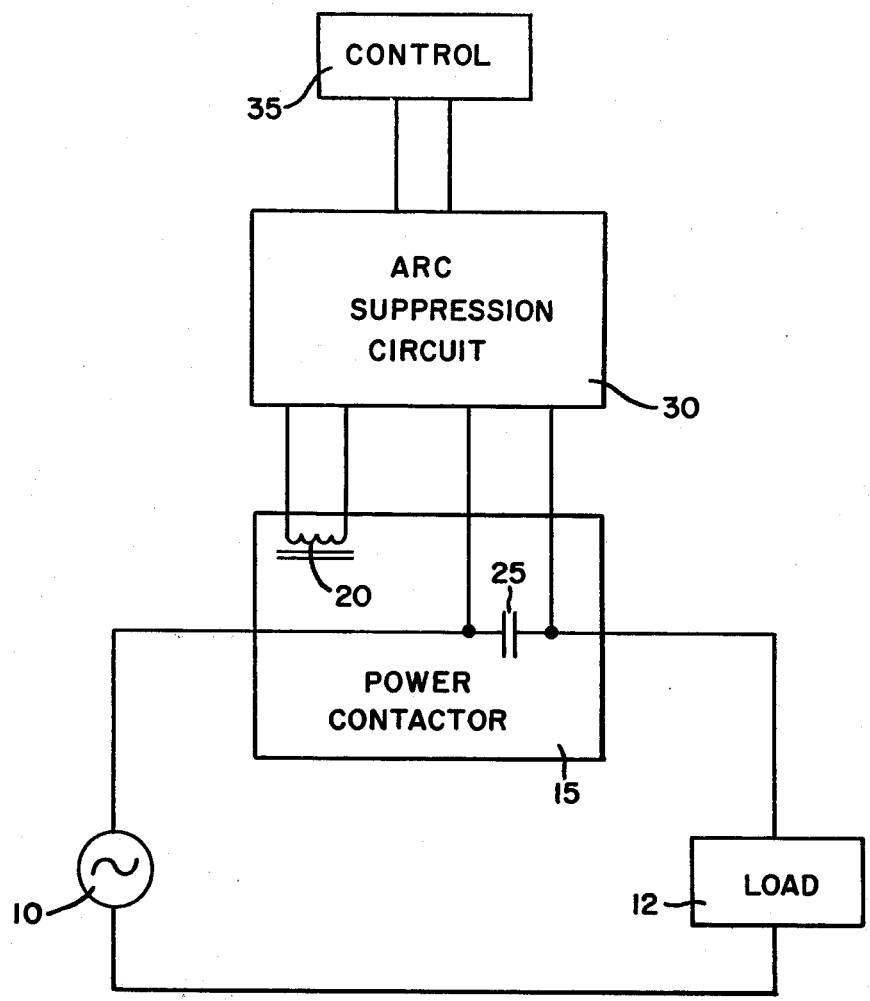
FIG. 1 is a block diagram showing an arc suppression circuit constructed according to this invention.

Referring now to the drawings which show the preferred embodiments of the invention, and particularly to the block diagram of FIG. 1, an alternating current power source 10 is connected to a load 12 through power contactor 15. The power contactor includes a coil 20 for controlling at least one set of power contacts 25. The coil 20 may also control other power contacts, such as in a three phase or three wire system, and it may also control the operation of auxiliary contacts.

An arc suppression circuit 30 includes semi-conductor means connected in parallel with the power contacts 25. The arc suppression circuit is also connected to the coil 20 so that the power contactor effectively operates under the direction of the arc suppression circuit. This invention differs from the other prior art arc suppression devices in that the arc suppression conductor devices are provided with gating current prior to the coil of the power contactor being energized.

A control circuit 35 controls the operation of the arc suppression circuit 30. The control circuit 35 may draw power from the alternating current source 10.

Figure 2:
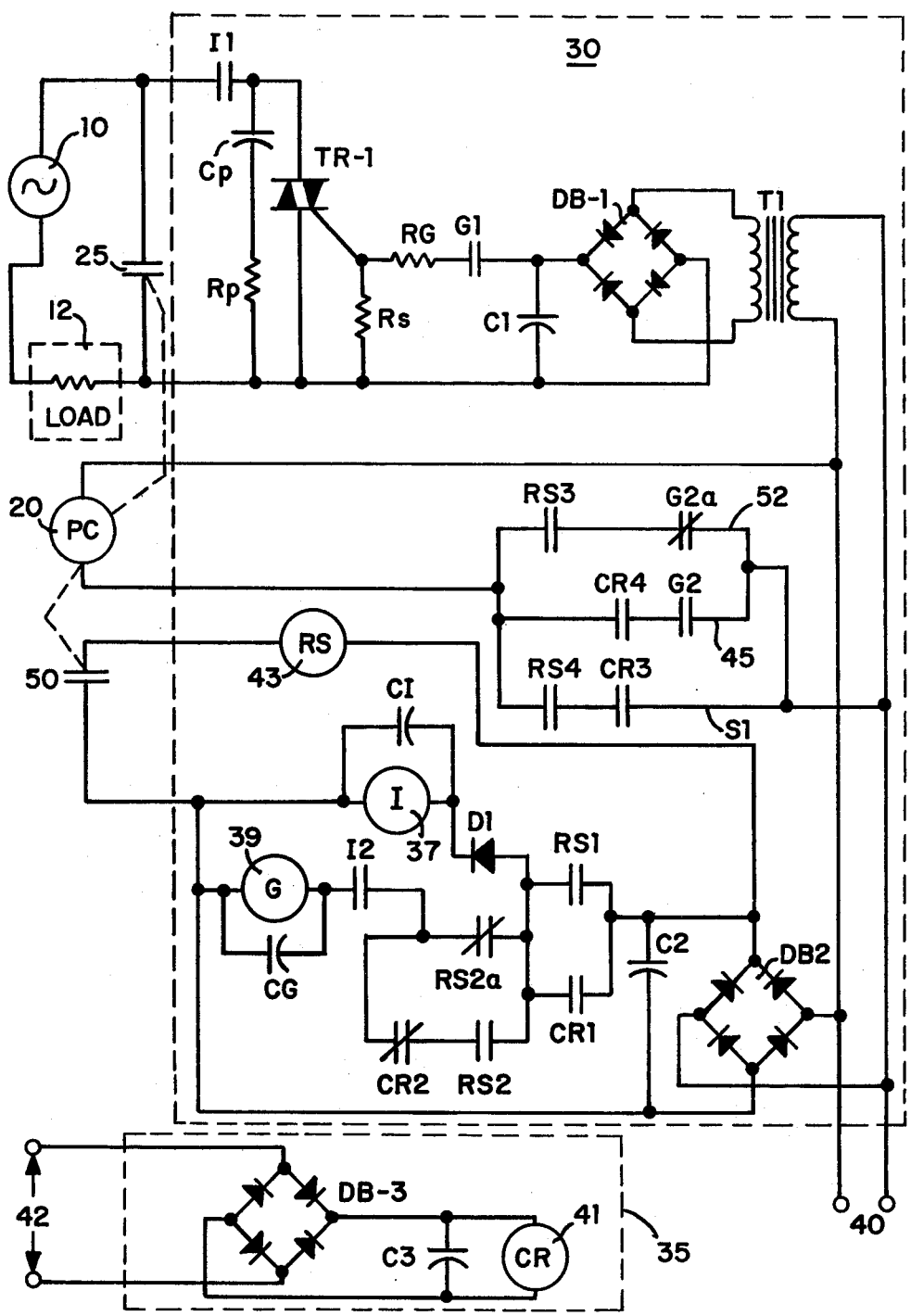
FIG. 2 is an electrical schematic diagram showing one embodiment of the invention.

Referring now to the embodiment of the invention shown in the schematic diagram of FIG. 2, the operation of which is illustrated in the waveform diagram of FIG. 3, a gate controlled thyristor or triac TR1 is connected in parallel with the power contacts 25 through the normally open contacts I1 of isolation relay 37, and the gate electrode of the triac is connected through the normally open contacts G1 of gate relay 39 to a source of direct current provided by bridge rectifier DB1 and transformer T1, the primary of which is connected to a source of alternating current 40. Also connected to the source 40 is bridge rectifier DB2.

A control relay 41 is connected through a diode bridge DB3 to a control voltage 42, which may be an alternating current voltage connected through a switch to source 10.

The diode bridge DB2 provides a source of direct current to the isolation relay 37, the gate relay 39 and a reset relay 43. The coil of power contactor 20 shown in FIGS. 6 and 10, is connected through relay contacts directed from the source of alternating current 40 and does not require direct current.

When a control voltage 42 is applied to the control circuit 35 at time T1 (see waveform diagram in FIG. 3), the control relay 41 will energize and will cause the isolation relay 37 to energize at time T2 as a result of contacts CR1 closing. Also, contacts CR3 and CR4 will close and CR2 will open at this time. The delay between T1 and T2 is a result of the inherent operation of the relay.

When the isolation relay 37 is energized, its normally open contacts I1 will connect the semiconductor arc suppression triac TR1 in parallel with the power contacts 24; and its normally open contacts I2 will complete a circuit through the normally closed contacts RS2A or the reset relay and the now closed contacts CR1 to energize gate relay 39.

A gate relay is therefore energized at time T3, at its contacts G1 and G2 will close. A current path will be provided between the gate of triac TR1 and the direct current source provided by the diode bridge DB1 by the contacts G1, causing the triac to begin conducting current in a path parallel to the power contacts 25.

Also, a path is provided through the now closed contacts G2 of the gate relay and contacts CR4 of the control relay on line 45 to the coil of the power contactor 20 which will energize at time T4, thus closing the main power contacts 25. If the power contacts close properly, the triac TR1 will therefore carry current for the time interval between T3 and T4.

In the preferred embodiment of this invention, the power contactor 15 includes auxiliary contacts 50, and these contacts close at time T4 and complete a path to the coil of the reset relay 43 which energizes at time T5. The normally closed contacts RS2A of reset relay 43 will open the circuit to the gate relay 39 which will then deenergize at time T6, removing gating current from the triac TR1 which thereafter will cease conducting at the first zero crossing of the alternating current line voltage from source 10, if it is assumed that the contacts 25 have not fully closed or closed with some resistance therebetween.

When the gate relay 39 deenergized, two current paths remain to supply current to the power contactor. The first is on line 51 through contacts CR3 and RS4; and the second is one line 52 through the normally closed contacts G2A of the gate relay and the normally open contacts RS3, which are now closed, of the reset relay.

Thus, it will be noted that the triac TR1 is connected in parallel with the main contacts, and gate current is applied thereto prior to voltage being applied to energize the coil 20 of the power contactor, and that the auxiliary contacts 50 of the power contactor must close before the gating current to the triac is removed.

When the control voltage is removed from the control relay 41 at time T7, contacts CR1, CR3 and CR4 of the control relay 41 will open. Thus, the current path on line 51 to the coil 20 of the power contactor is broken, but a path remains on line 52 through the normally closed contacts 62a of the gate relay 39. Normally closed contacts CR2 of the control relay 41 will close to provide a path through contacts RS1 and RS2 and I2 to energize gate relay 39 at time T8. The contact G1 of the gate relay reapplied gating current to the triac TR1. Exitation current to the coil 20 of the power contactor is removed by the opening of contacts G3A, and thus the power contactor deenergizes at time T9.

When the contacts 50 of the power contactor open, reset relay 43 is deenergized, and power will be removed from the isolation relay 37 and the gate relay 39; however, gate relay 39 will be held in momentarily by capacitor CG so that the gate current is not removed from the triac TR1 until after the contacts 25 of the power contactor have opened. Capacitor C1, connected in parallel with the isolation relay coil 37, prevents this relay from completely deenergizing until time T12. The difference between time T9 and T12 is set at more than eight milliseconds, or sufficient time to allow at least one zero crossing of the alternating current input so that the triac TR1 will be extinguished at the first zero crossing, therefore protecting the contacts I1 of the isolation relay 37.

Resistors RS and RP and capacitor CP increase the dV/dt rating of triac TR1, as is well known to those skilled in the art. Resistor RG limits gate current to the triac.

Auxiliary contacts 50 may be carried either by the power contactor 15 and opened and closed simultaneously with the power contacts 25, or they may be carried by a separate relay connected in parallel with the coil 20 of the power contactor.

Figure 4:
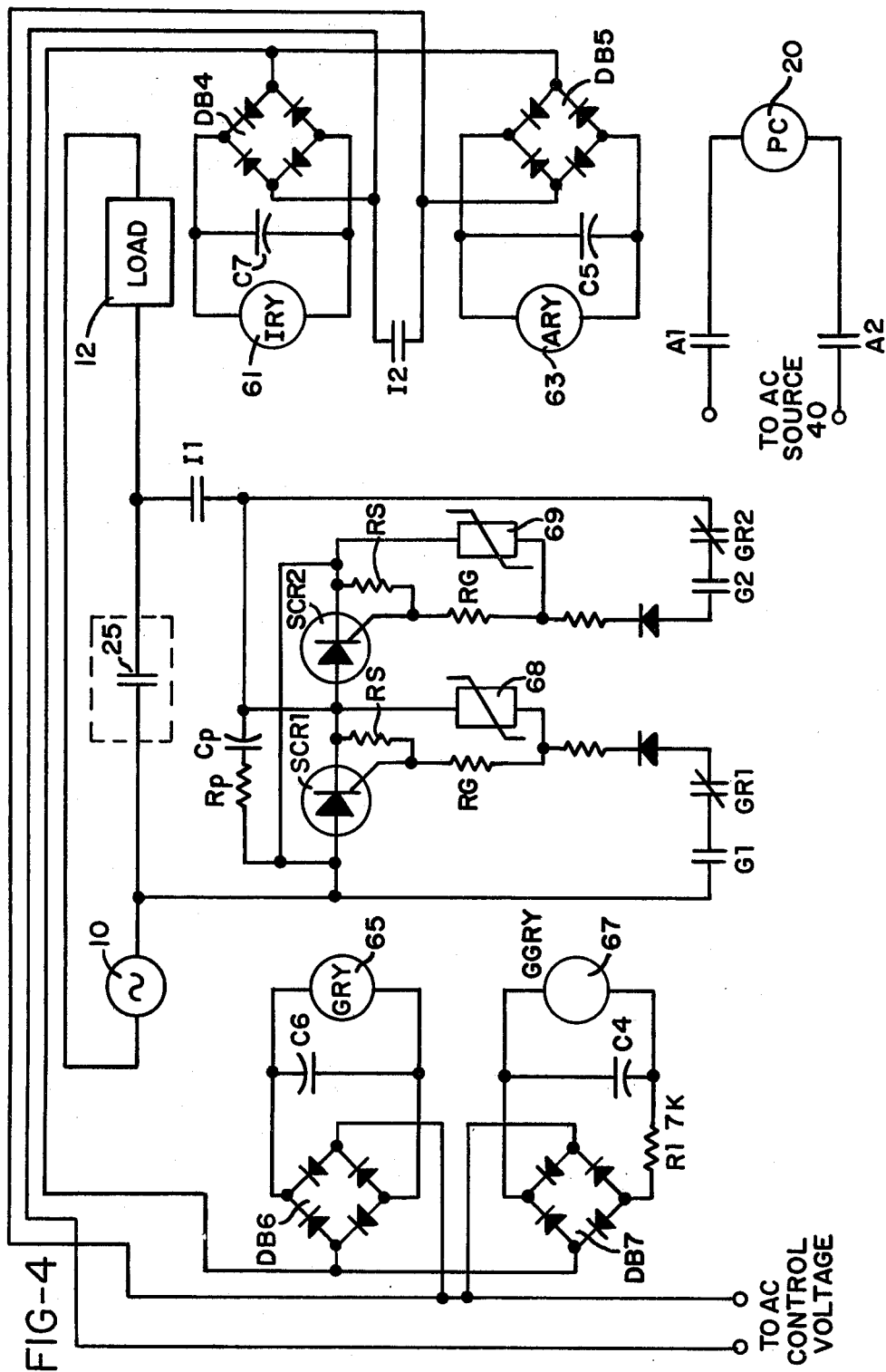
FIG. 4 is an electrical schematic diagram of a second embodiment of the invention.

Referring now to a second embodiment of the invention shown in the schematic diagram of FIG. 4 and illustrated in the waveform diagram of FIG. 5, a pair of semiconductor devices or silicon controlled rectifiers SCR1 and SCR2 are connected in back to back relation with each other and in parallel with the power contacts 25 through the contacts I1 of an isolation relay 61. The isolation relay, in turn, includes a coil which is provided with direct current through a bridge rectifier DB4, the input to which is connected to the control voltage 35.

Thus, upon application of a control signal, the isolation relay 61 will close at time T21, as shown in FIG. 5. The isolation relay also includes a second contact I2 which connectes the alternating current control voltage to further diode rectifiers DB5, DB6 and DB7, each of which provides independently direct current voltage to the auxiliary relay 63, the gate relay 65 and the gate removal relay 67, respectively.

The gate relay 65 will energize at time T22, and its contacts G1 and G2 will provide gating current to the gate electrodes of both SCR1 and SCR2, respectively.

It will be noted that the gate circuit includes MOV devices 68 and 69 for preventing excessive current from being applied to the gate electrodes.

Next, the auxiliary relay 63 will be energized at time T3, and its normally open contacts A1 and A2 connect the coil 20 of the power contactor to a source of alternating current, causing the power contactor to be energized at time T24.

The gate removal relay 67 is connected to its diode bridge DB7 through a time delay circuit T1 including resistor R1 and capacitor C4. This time delay circuit delays the energization of relay 67 until time T25, at which time its normally closed contacts GR1 and GR2 will open to remove gating current from the arc suppression semiconductors SCR1 and SCR2.

Thus, the arc suppression circuit is supplied with gating current for the time interval T22 through T25, after which gating current is removed, and the power contacts 25 alone are responsible for carrying all of the current to the load 12.

When control voltage is removed from the circuit, the gate removal relay 67 will deenergize at time T26. The time is a function of the resistance of the coil of the gate removal relay and capacitor C4. When the gate removal relay deenergizes, its normally closed contacts GR1 and GR2 will again close and provide a path for gating current to SCR1 and SCR2.

The auxiliary relay 61 will be deenergized at time T27. Again, this relay is determined by the resistance of the relay coil and the capacitor C5 in parallel therewith. When the auxiliary relay 63 deenergizes, its contacts A1 and A2 will open the current path to the power contactor coil 20 which will deenergize at time T28 due to the mechanical characteristics of the contactor, opening the path through power contacts 25 to the load 12.

Thereafter, the gate relay 65 will open at time T29, again through the action of the resistance of the relay coil and the capacitor C6 in parallel therewith. Contacts G1 and G2 will open and remove gating current to SCR1 and SCR2, which will extinguish at the first zero crossing of the alternating current line voltage.

Finally, isolation relay 61 will open after a time delay at time T3, determined by the resistance of its coil and capacitor C7, sufficient to insure that the alternating current voltage has gone through a zero crossing, thus allowing the SCRs to be extinguished prior to the opening of the isolation relay thereby protecting its contacts I1 from switching off while current flows to the load 12.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a device for suppressing arcing of the contacts of a power contactor having a coil and at least one pair of contacts closable in response to the energization of said coil, including at least one gate controlled thyristor connectable across the contacts, and means for providing gating current to said thyristor prior to, during and following the closing of said contacts, the improvement comprising gate circuit means for providing gating current to the thyristor before the coil of said power contactor is energized, means for thereafter energizing the coil of said power contactor to close the contacts thereof, and means for removing gating current to said thyristor after said contacts have closed.

2. The device of claim 1 further including isolation means for connecting said thyristor in parallel with said contacts prior to the closing thereof.

3. In a device for suppressing arcing at the contacts of a power contactor having a coil and at least one pair of contacts closable in response to the energization of the coil, said device including at least one gate controlled thyristor connectable across the contacts, and means for providing gating current to said thyristor prior to, during and following the opening of said contacts, the improvement comprising gate circuit means for providing gatin current to said thyristor before the coil of said power contactor is deenergized, means for thereafter deenergizing the coil of said power contactor to open the contacts, and means for removing gating current to said thyristor after said contacts have fully opened.

4. In a device for protecting the contacts of a power contactor having a coil and at least one pair of contacts closable in response to the energization of said coil, said device including at least one gate controlled thyristor connectable across the contacts, and means for providing gating current to said thyristor prior to, during and following the closing and opening of said contacts to suppress arcing, the improvement comprising means for connecting said thyristor in parallel with said contacts upon the application of the control voltage to energize said power contactor, means responsive to the application of the control voltage for providing gating current to said thyristor prior to the coil of said power contactor being energized, means for thereafter energizing the coil of said power contactor to close the contacts thereof, and means for removing gating current from said thyristor after said contacts have closed, said improvement further comprising means for providing gating current to said thyristor before the coil of said power contactor is deenergized upon removal of said control voltage, means responsive to the removal of said control voltage for removing current from the coil of said power contactor to open the contacts thereof, means for removing the gating current to said thyristor after said contacts have opened, and means for disconnecting said thyristor from its parallel circuit with said contacts.

5. The device of claim 4 wherein said means for providing gating current to said thyristor includes a source of direct current.

6. The device of claim 4 wherein said thyristor is a triac.

7. The device of claim 4 wherein said thyristor is a pair of silicon controlled rectifiers.

8. In a device for protecting the contacts of a power contactor having a coil and at least one pair of power contacts closable in response to the application of a control voltage, said device including at least one gate controlled thyristor connectable across the contacts, and means for providing gating current to said thyristor prior to, during and following the closing and opening of said power contacts to suppress arcing, the improvement comprising an isolation relay responsive to the application of the control voltage having first contacts for connecting said thyristor in parallel with the contacts of said power contactor, a gating relay responsive to second contacts of said isolation relay for providing gating current to said thyristor prior to the coil of said power contactor being energized, an auxiliary relay responsive to said second contacts of said isolation relay, said auxiliary relay having contacts which close after said gating relay contacts close for providing a current path to the coil of said power contactor, a gate removal relay, and means responsive to said second contacts of said isolation relay and including a first time delay circuit for energizing said gate removal relay after said power contacts have closed, said gate removal relay having contacts for removing gating current from said thyristor means after the contacts of said power contacts have closed, said improvement further comprising second delay means responsive to the removal of said control voltage for deenergizing said gate removal relay thereby reapplying gating current to said thyristor means, second delay means responsive to the removal of said control voltage for deenergizing said auxiliary relay to remove current from the coil of said power contactor after said gating current has been reapplied to said thyristors, third delay means responsive to the removal of said control voltage for deenergizing said gating relay means to remove gating current from said thyristors after said power contacts have opened, and fourth delay means responsive to the removal of said control voltage for deenergizing said isolation relay to disconnect said thyristor from in parallel with said power contacts after said power contacts have opened and gating current has been removed from said thyristor.

9. In a device for protecting the contacts of a power contactor having a coil and at least one pair of contacts closable in response to the application of a control voltage, said device including at least one gate controlled thyristor connectable across the contacts, and means for providing gating current to said thyristor prior to, during and following the closing and opening of said contacts to suppress arcing, the improvement comprising a control relay, responsive to the application of the control voltage, having four sets of normally open contacts, an isolation relay connected to a source of power through one set of said normally open contacts of said control relay for connecting said thyristor in parallel with said power contacts, a gate relay connected to a source of power through another normally open contact of said control relay for providing gating current to said thyristor prior to the coil of said power contactor being energized, said power contactor coil being connectable to a source of power through normally open contacts of said gate relay and said control relay, a reset relay being connectable to a source of power through auxiliary contacts responsive to the energization of said power contactor, said reset relay having normally closed contacts connected in series with said gate relay for deenergizing said gate relay and remove gating current from said thyristor after said power contacts have closed, said reset relay further including normally open contacts in series with further normally open contacts of said control relay for providing a current path to said power contactor after said gate relay is deenergized, said improvement further comprising said gate relay having normally closed contacts and said reset relay having normally open contacts in series with the coil of said power contactor to maintain a current path thereto after said control relay is deenergized, said control relay having normally open contacts in series with normally closed contacts of said reset relay for energizing said gate relay to provide gating current to said thyristor, and whereby said normlly closed contacts of said gate relay causes current to be removed from said power contactor causing the contacts thereof to open, whereby said reset relay is deenergized upon the opening of the auxiliary contacts of said power contactor, whereby said gate relay is deenergized by the opening of said normally open contacts of said reset relay thereby removing gating current from said thyristor after said power contacts have opened, and capacitor means connected across the coil of said isolation relay for delaying the opening of the contacts thereof until after said gate relay has deenergized.

10. The device of claim 9 wherein said auxiliary contacts are carried by said power contactor and open and close simultaneously with said power contacts.

* * * * *